May 22, 1956 L. A. OHLINGER 2,746,473
VALVE MEANS FOR CHARGING CONTAINERS WITH FLUID
Filed Jan. 9, 1947 2 Sheets-Sheet 1
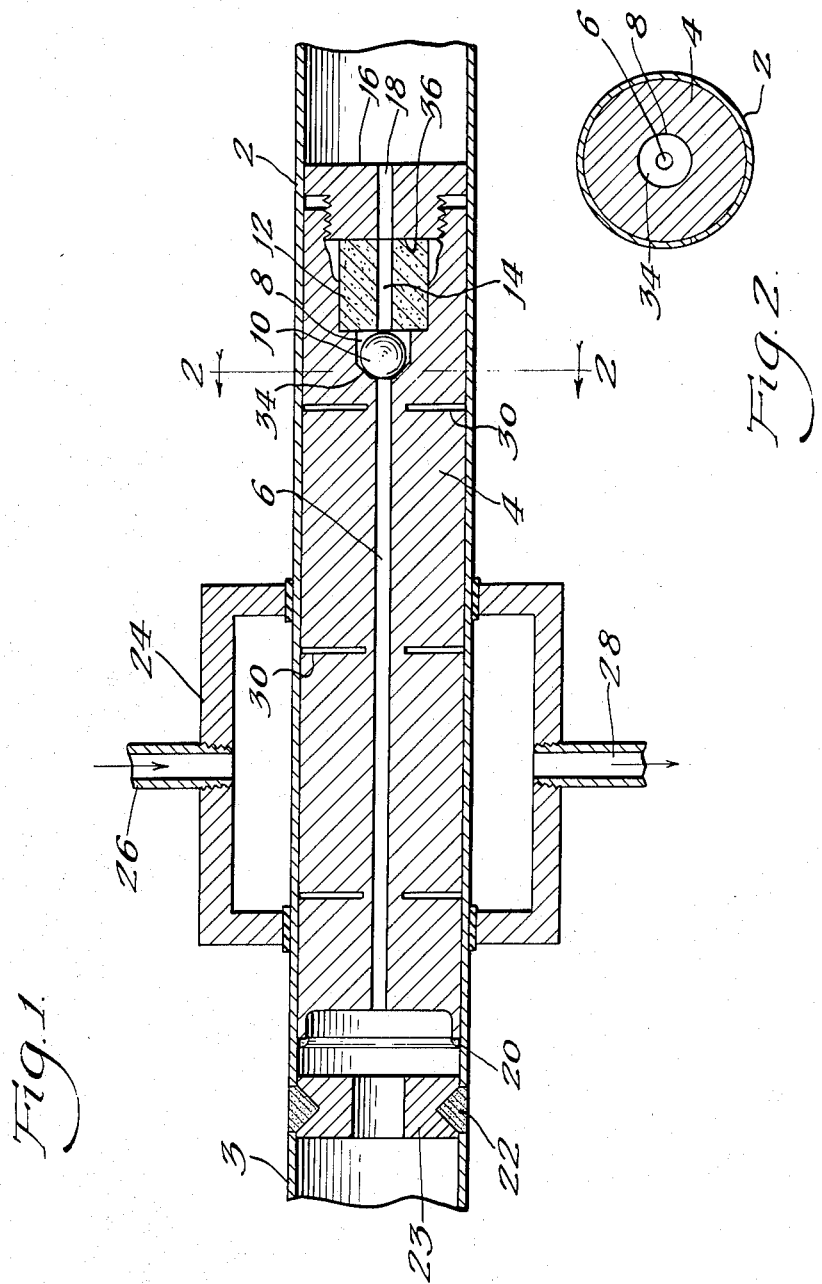
INVENTOR.
Leo A. Ohlinger
BY
Robert A. Launder
Attorney May 22, 1956 L. A. OHLINGER 2,746,473
VALVE MEANS FOR CHARGING CONTAINERS WITH FLUID
Filed Jan. 9, 1947 2 Sheets-Sheet 2
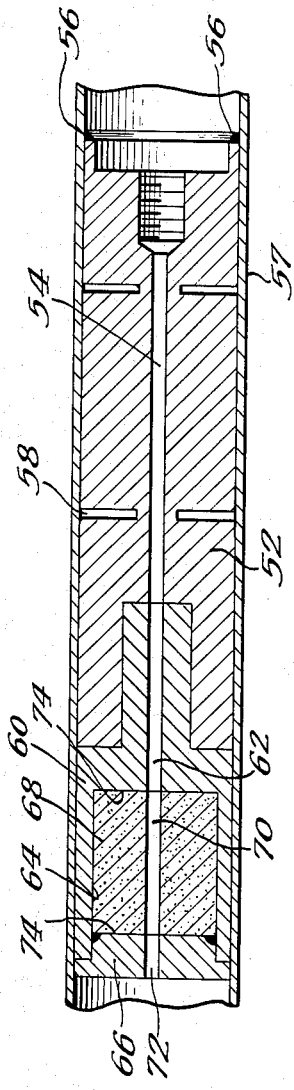
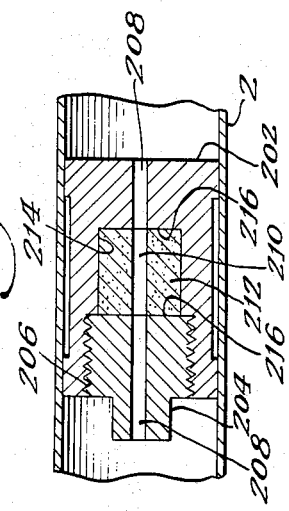
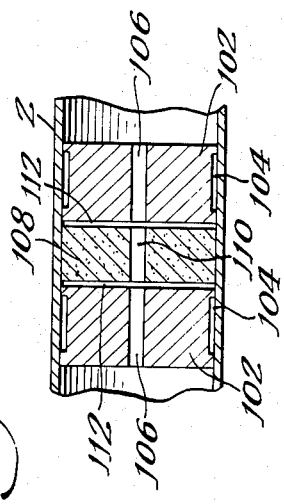
Witness:
Walter F. Schlegel, Jr.
INVENTOR.
Leo A. Ohlinger
BY
Robert A. Lavender
Attorney.

United States Patent Office 2,746,473
Patented May 22, 1956

2,746,473

VALVE MEANS FOR CHARGING CONTAINERS WITH FLUID

Leo A. Ohlinger, Los Angeles, Calif., assignor to the United States of America as represented by the United States Atomic Energy Commission Application January 9, 1947, Serial No. 721,063

2 Claims. (Cl. 137—74)

This invention relates to a novel method and means for charging a container with fluid and sealing the container to prevent escape of said fluid therefrom.

The invention is particularly applicable to gases which are noninflammable, and comprises a novel method and means for sealing the container by melting a sealing element in the charging passage through which the gas enters the container.

A general object of the invention is to seal or close a fluid passage by heating the interior thereof from a point externally thereof to melt a sealing element therein.

Another object of the invention is to design a novel valve device comprising a metallic body and a valve member adapted to be melted in said body and bonded thereto to seal a flow passage through said body.

The foregoing and other objects and advantages of the invention will become apparent from a consideration of the specification and the accompanying drawings, wherein:

Fig. 1 is a central longitudinal sectional view through a conduit and the novel valve means therein as well as a cooling jacket therearound;

Fig. 2 is a cross sectional view taken on the line 2—2 of Fig. 1;

Fig. 3 is a central longitudinal sectional view through a conduit and modified valve means embodying the invention;

Fig. 4 is a central longitudinal sectional view through a conduit and associated valve means embodying another modification of the invention; and Fig. 5 is a central longitudinal sectional view through a conduit and associated valve means embodying still another modification of the invention.

Describing the invention in detail and referring first to the embodiment thereof illustrated in Fig. 1, the conduit generally designated 2 is preferably in the form of an aluminum tube or pipe welded to a substantially identical tube or conduit 3 forming a part of segment thereof. The conduit 2 is adapted to contain a plurality of fissionable cylindrical slugs (not shown) such as natural uranium serving as fuel for a neutronic reactor undergoing a nuclear fission chain reaction. The conduit 2 contains a plurality of said slugs tightly fitted therein in spaced relationship with respect to each other and with fluid passages connecting the spaces between the slugs to accommodate filling of said spaces with a noninflammable gas having a very small neutron capture cross section such, as for example, helium. After the conduits 2 and 3 have been filled with helium to the desired pressure, the conduit 2 is sealed by the novel valve means, hereinafter described, and the unit is then suitable for insertion within a neutronic reactor, the helium functioning as a telltale to afford indication of leaks which may accidentally develop in the conduit 2 which is adapted to afford a protective jacket around the uranium slugs, preventing leakage of radioactive matter into the coolant flowing externally of the conduit in heat exchange relationship with the slugs fitted therein.

The novel valve means shown in Fig. 1 comprises an aluminum body 4 with a longitudinal passage 6 therein terminating in enlarged portion 8, affording a receptacle or recess receiving a ball valve member 10. A soft metal valve member 12 formed of a relatively low melting point alloy such as solder is recessed in the body 4 and has therethrough a passage 14 aligned with the passage 6, said member 12 being retained by a nut 16 threaded into the body 4 and having therethrough a passage 18 aligned with the passage 14.

In practicing the invention, the tube 2 containing the before-mentioned slugs (not shown) is welded as at 20 to the body 4 and is then welded or spliced at 22 to an aluminum ring 23 and to the before-mentioned segment 3. The conduit 2 is cooled during these welding processes by a water jacket 24 through which any suitable coolant fluid such as water is circulated by inlet and outlet conduits 26 and 28, respectively, thereby preventing accidental melting of the valve member 12 during the welding at 20 and 22. Furthermore, the body 4 is provided with annular grooves 30 spaced longitudinally thereof to retard heat conduction, and to facilitate breaking of the assembly into pieces for subsequent processing after use in a neutronic reactor.

After the various parts of the novel device have been assembled as shown in Fig. 1, the left end of the tube therein is connected to a source of pressure gas such as helium, which is noninflammable at the relatively low melting point of the member 12. Under these conditions, the helium flows freely through the passages 6, 14, and 18, filling the tube 2 to the desired pressure. The ball valve member 10 is unable to block the passage 14 inasmuch as the inner surface of the fusible valve member 12 is unfinished and is thus sufficiently rough to prevent the smooth seating necessary for blocking. When the tube 2 is filled to the desired pressure, the withdrawal of applied pressure seats the ball valve member 10 against the passage 6 so as to prevent leakage of the gas during the sealing operation, the surface 34 being smoothly finished so as to allow proper seating of the valve member 10. The member 12 is melted by heating the tube 2 in the vicinity thereof as by an induction coil or any other suitable heating means (not shown), whereupon the solder of which the member 12 is formed seals the space in the body 4 between the passages 18 and 6. Thus, when the solder cools, the passage 6 is effectively closed against the flow of helium therethrough. In this connection it may be noted that the surfaces of the body 4 and nut 16 at 34 and 36, respectively, are preferably tinned to afford a good bond with the solder of which the member 12 is preferably formed. Since as shown in Fig. 1 the spacing between opposed seats on the fusible member 12 in the body 4 is sufficiently small to allow little movement to the closure element 10, melting of the fusible member 12 will necessarily result in the closing of the apertures 6 and 14 by the closure element 10.

Referring now to Fig. 3, a modification of the novel valve means is shown wherein the valve body is a composite prefabricated structure comprising an aluminum cylindrical portion 52 with a flow passage 54 therethrough, said portion being adapted to be welded at 56 to the associated aluminum tube 57 therearound, as in the previously described embodiment. The aluminum portion 52 is provided with annular grooves 58 to prevent conduction of heat therealong during the welding process and to facilitate breaking thereof, as heretofore discussed in connection with Fig. 1. The body also comprises a steel portion 60 secured to the portion 52 by the well-known "Al-Fin" process and comprises a passage 62 communicating with the passage 54. The portion 60 comprises a cylindrical chamber 64 closed by a steel cap 66 secured in any manner to the portion 60 as, for example, by welding, said cap 66 being in snug abutment with a valve member 68 formed of solder and having therethrough a passage 70 communicating with the passage 62 and a passage 72 through the cap 66. Thus, during the novel process, the helium flows through the valve body from end to end thereof until the fusible valve member 68 is melted within the chamber 64 to prevent flow of helium therethrough, the valve member being bonded to the steel members 60 and 66 of the valve body which are tinned at 74 for this purpose.

Referring now to Fig. 4, another embodiment of the novel valve means is shown which is particularly adapted to be bonded within the associated aluminum tube 2. In this embodiment of the invention, the valve body is formed of spaced cylindrical segments 102 bonded to the internal surface of the tube 2 within annular recesses 104 in the outer perimeters of the members 102. The members 102 have aligned passages 106 therethrough communicating with the space therebetween which contains a cylindrical member 108 formed of low melting point solder and having a passage 110 adapted to accommodate flow of fluid between the passages 106 until the member 108 has been melted, as in the previously described embodiments of the invention, to seal the space between the members 102 against flow of helium through the passages 106. The solder during the melting of the member 108 is bonded to the members 102 which are preferably tinned on their adjacent surfaces as at 112.

Referring now to Fig. 5, another embodiment of the invention is shown wherein the aluminum tube 2 contains a steel body member 202 bonded therein as in the embodiment of Fig. 4 and with a nut or cap portion 204 connected thereto as by threaded engagement therewith at 206. The member 202 and the cap portion 204 comprise flow passages 208 therethrough aligned with a passage 210 through a valve member 212 formed of solder, as in the previously described embodiments. It will be understood that upon melting of the valve member 212, the solder of which this member is formed blocks flow of helium through the chamber 214 in the valve body 202, the body 202 and the cap portion 204 therein being tinned as at 216 to accommodate a bond between the solder and the valve body.

It will be understood that the above-described embodiments of the invention are merely by way of illustration and not limitation inasmuch as various and other modifications of the novel method and apparatus for carrying out the invention will be readily apparent to those skilled in the art without departing from the spirit of the invention or the scope of the appended claims.

What is claimed is:

1. A valve comprising a body having an aperture and a seat at one end of the aperture, a fusible member mounted in the body and having an aperture and a seat in spaced opposed relation to the seat of the body, a closure element positioned in the space between said seats so as to engage the seat of the body and close its aperture or to engage the seat of the fusible member without closing its aperture, spacing between the opposed seats formed on the body and the fusible member being sufficiently small to allow little movement to the closure element, whereby upon melting the fusible member bonds the closure element to the body and to itself and thereby causes the closure element to close the apertures in the body and the fusible member.

2. A valve as specified in claim 1, the closure element being a spherical ball, the fusible member being roughened so as to prevent the ball from closing the aperture of the fusible member when engaging the seat thereof.

References Cited in the file of this patent
UNITED STATES PATENTS

| | | |
|---|---|---|
| 1,487,657 | Hunt | Mar. 18, 1924 |
| 2,049,117 | Hubert | July 28, 1936 |
| 2,093,567 | McCullough | Sept. 21, 1937 |
| 2,101,156 | Payne | Dec. 7, 1937 |
| 2,202,337 | Cohn | May 28, 1940 |
| 2,262,176 | Geiger et al. | Nov. 11, 1941 |
| 2,401,638 | Herzog et al. | June 4, 1946 |